United States Patent
Altinger et al.

(10) Patent No.: US 10,269,250 B2
(45) Date of Patent: Apr. 23, 2019

(54) METHOD FOR COORDINATING THE TRAFFIC OF MOTOR VEHICLES IN A PARKING ENVIRONMENT

(71) Applicant: Audi AG, Ingolstadt (DE)

(72) Inventors: Harald Altinger, Gerolfing (DE); Florian Schuller, Ismaning (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/553,016

(22) PCT Filed: Feb. 12, 2016

(86) PCT No.: PCT/EP2016/000244
§ 371 (c)(1),
(2) Date: Aug. 23, 2017

(87) PCT Pub. No.: WO2016/134827
PCT Pub. Date: Sep. 1, 2016

(65) Prior Publication Data
US 2018/0053422 A1    Feb. 22, 2018

(30) Foreign Application Priority Data

Feb. 24, 2015 (DE) .................. 10 2015 002 405

(51) Int. Cl.
*G08G 1/00* (2006.01)
*E04H 6/42* (2006.01)
(Continued)

(52) U.S. Cl.
CPC ............ *G08G 1/20* (2013.01); *B62D 15/028* (2013.01); *B62D 15/0285* (2013.01);
(Continued)

(58) Field of Classification Search
CPC .......... G08G 1/20; G08G 1/146; G08G 1/143; E04H 6/422; B62D 15/028; B62D 15/0285; G05D 1/0297; G05D 2201/0213
See application file for complete search history.

(56) References Cited

U.S. PATENT DOCUMENTS 8,798,852 B1 * 8/2014 Chen .................. G06F 21/44
701/29.6
8,825,250 B2 * 9/2014 Luke ..................... B60L 11/005
180/65.1
(Continued)

FOREIGN PATENT DOCUMENTS

DE    102005029336 A1    4/2006
DE    102008027692 A1    12/2009
(Continued)

OTHER PUBLICATIONS

International Preliminary Report on Patentability directed to related International Patent Application No. PCT/EP2016/000244, dated Feb. 2, 2017, with attached English-language translation; 15 pages.
(Continued)

*Primary Examiner* — Frederick M Brushaber
(74) *Attorney, Agent, or Firm* — Sterne, Kessler, Goldstein & Fox P.L.L.C.

(57) ABSTRACT

The present disclosure discloses a method for coordinating the traffic of motor vehicles in a parking environment. The method evaluates sensor data and determines current traffic situation data of a parking environment based on the evaluating. The method determines a target corridor for a destination of a motor vehicle based on current traffic situation data, a map data set, and target corridors determined for other motor vehicles. The method transmits the target corridor to the motor vehicle, and a recommendation to wait to another motor vehicle during a planned departure of the other motor vehicle from the parking environment. The
(Continued)

method outputs a confirmation of a request for an automatic departure of the other motor vehicle to a mobile device when a time to reach an exit according to an optimal target corridor exceeds a threshold value.

14 Claims, 2 Drawing Sheets

(51) Int. Cl.
    *B62D 15/02*     (2006.01)
    *G05D 1/02*     (2006.01)
    *G08G 1/14*     (2006.01)

(52) U.S. Cl.
    CPC ............ *E04H 6/422* (2013.01); *E04H 6/426* (2013.01); *G05D 1/0297* (2013.01); *G08G 1/143* (2013.01); *G08G 1/146* (2013.01); *G08G 1/149* (2013.01); *G05D 2201/0213* (2013.01)

(56) References Cited

U.S. PATENT DOCUMENTS

| | | | |
|---|---|---|---|
| 9,104,537 B1* | 8/2015 | Penilla | G06F 17/00 |
| 9,124,085 B2* | 9/2015 | Wu | H02H 1/00 |
| 9,346,365 B1* | 5/2016 | Penilla | B60L 11/18 |
| 9,434,270 B1* | 9/2016 | Penilla | B60L 11/18 |
| 9,442,489 B2 | 9/2016 | Reichel et al. | |
| 9,718,370 B2* | 8/2017 | Penilla | B60L 11/18 |
| 9,802,500 B1* | 10/2017 | Penilla | B60L 11/18 |
| 2010/0156670 A1* | 6/2010 | Hamilton, II | G07B 15/06 340/928 |
| 2010/0156672 A1 | 6/2010 | Yoo et al. | |
| 2011/0130906 A1* | 6/2011 | Mayer | G07C 5/008 701/22 |
| 2011/0130916 A1* | 6/2011 | Mayer | G07C 5/008 701/31.4 |
| 2012/0197693 A1* | 8/2012 | Karner | G06Q 20/102 705/14.1 |
| 2013/0031318 A1* | 1/2013 | Chen | H02J 7/00 711/154 |
| 2013/0179061 A1* | 7/2013 | Gadh | B60L 11/1842 701/123 |
| 2014/0046506 A1 | 2/2014 | Reichel et al. | |
| 2014/0047347 A1* | 2/2014 | Mohn | G08G 1/00 715/738 |
| 2014/0229249 A1* | 8/2014 | Chiu | G08G 1/0112 705/14.1 |
| 2014/0229255 A1* | 8/2014 | Scofield | G06Q 30/0207 705/14.21 |
| 2014/0379385 A1* | 12/2014 | Duncan | G06Q 40/08 705/4 |
| 2015/0112542 A1* | 4/2015 | Fuglewicz | G07C 5/0858 701/32.2 |
| 2015/0128123 A1* | 5/2015 | Eling | G06F 8/654 717/171 |
| 2016/0371982 A1* | 12/2016 | Arndt | G08G 1/143 |
| 2016/0375780 A1* | 12/2016 | Penilla | B60L 11/18 320/109 |
| 2017/0178172 A1* | 6/2017 | Balasubramanian | G06Q 30/0231 |
| 2017/0320398 A1* | 11/2017 | Penilla | B60L 11/18 |
| 2018/0037125 A1* | 2/2018 | Penilla | B60L 11/18 |

FOREIGN PATENT DOCUMENTS

| | | |
|---|---|---|
| DE | 102012015968 A1 | 3/2014 |
| DE | 102012021282 A1 | 4/2014 |
| DE | 102012222562 A1 | 6/2014 |

OTHER PUBLICATIONS

English-language abstract of German Patent Application Publication No. 198 39 378 A1, published Mar. 9, 2000; 1 page.

Julian Timpner et al., "A back-end system for an autonomous parking and charging system for electric vehicles," *Institute of Operating Systems and Computer Networks*; Braunschweig, Germany; 8 pages.

Kyounghwan An et al., "Cooperative vehicle control system based on fusion map," *IT Convergence Technology Research Department, Electronics and Telecommunications Research Institute*; Daejeon, Korea; 4 pages.

International Search Report and Written Opinion of the International Searching Authority directed to related International Patent Application No. PCT/EP2016/000244, dated May 19, 2016, with attached English-language translation; 29 pages.

\* cited by examiner

METHOD FOR COORDINATING THE TRAFFIC OF MOTOR VEHICLES IN A PARKING ENVIRONMENT

TECHNICAL FIELD

The invention relates to a method for coordinating the traffic of motor vehicles in a parking environment, wherein, to the parking environment, are assigned a central computing unit—in particular, a server—and sensors monitoring the parking environment and delivering sensor data to the central computing unit, and a map data set of the parking environment is stored in the central computing unit. In addition, the invention relates to such a central computing unit of a parking environment.

BACKGROUND

Parking environments for motor vehicles are, in particular, known as parking garages and as parking lots comprising several parking spaces for motor vehicles. In the past, the demand for being able to improve the navigation in such parking environments has increased more and more. Systems were thus, for example, proposed in which a motor vehicle is to be assigned to a parking space in the parking garage automatically, wherein appropriate sensors are arranged for this purpose on the parking spaces, via which sensors it can be determined whether a parking space is occupied or not. Other proposals provide that via a central computing unit of the parking environment, with which the motor vehicle establishes a communication link, such as a WLAN connection or a GSM connection, via motor-vehicle-to-infrastructure communication, a map data set of the parking environment is transmitted to the motor vehicle, wherein the map data set can be used in a navigation system of the motor vehicle in order to guide the driver through the parking environment to the parking space. Based on the specification of the destination parking space, the internal navigation system of the motor vehicle thus calculates, using the map data set, a route that leads the motor vehicle to the destination parking space, wherein the destination parking space can be transmitted together with the map data set.

The determination of such map data sets by measurements, from construction plans, and/or at least partially manually is already known in the prior art. In order to bring about improvements in this respect, it was proposed to provide additional sensors in the parking environment, which sensors can detect newly appearing or disappearing obstacles and enter them accordingly into the map data set so that the latter can be kept current dynamically. In this way, it is also possible to react to changes occurring dynamically in the navigability of the parking environment. In this context, it was also proposed to use sensor data or general environmental data of the motor vehicles operating in the parking environment, or even of the motor vehicles parked in the parking environment, in order to update the map data set and to thus always provide the ideal basis for the route planning for the motor vehicles.

If each motor vehicle currently calculates for itself a route to be traveled to the destination parking space, it can only take into consideration in the process other motor vehicles operating in the parking environment within its own environmental detection capabilities, which can lead to hindrances, time delays, or even the impossibility of proceeding further. This is particularly critical with respect to fully automated parking processes in the parking environment, in which vehicle systems designed for the fully automatic guidance of the motor vehicle can, for example, be used, which systems are, however, also provided with only limited information about the traffic situation in the parking environment.

DETAILED DESCRIPTION

The invention is based on the aim of specifying a possibility for improved, coordinated navigation of motor vehicles in parking environments.

In order to achieve this aim, the invention provides that, in a method of the aforementioned type, the central computing unit is designed to spatially and temporally coordinate the traffic in the parking environment by determining current traffic situation data of the parking environment, which data includes the position of motor vehicles operated in the parking environment, by monitoring and analyzing at least the sensor data and by respectively determining for the motor vehicles operating in the parking environment, taking into account the traffic situation data, the map data set, and the spatial and temporal target corridors determined for other motor vehicles as input data, a spatial and temporal target corridor for a destination of the motor vehicle and transmitting it to the respective motor vehicle.

As is basically known, a central computing unit that can provide map data of the parking environment—in particular, of a parking garage—and can, in particular, also update the map data dynamically is thus used in the parking environment. This central computing unit can furthermore, as is basically known, communicate with motor vehicles operated in the parking environment. With respect to the map data set, it is also noted that the mentioned dynamic updating of the map data set, which is also possible within the framework of the present invention, can also include the assignment of current meta data to the map data set, which can, for example, describe obstacles, incorrectly parked motor vehicles, and the like.

According to the invention, it is now proposed on the one hand to use the sensor data of the sensors provided in the parking environment in order to also be able to track the positions of the motor vehicles operating in the parking environment, to thus determine traffic situation data in the parking environment, which data can also include an explicit tracking of the motor vehicles operating in the parking environment, and thus a description of the movements of motor vehicles and the like. Together with the map data set, this traffic situation data can be used to determine, for the motor vehicles operating in the parking environment, temporal and spatial specifications for target corridors to be determined specifically in the motor vehicle and describing trajectories to be traveled by the same, which specifications state within which limits the motor vehicle can ideally arrive at a destination parking space via a specific trajectory, or get from the current parking space to an exit of the parking environment. In doing so, the method particularly advantageously uses the fact that the respective route planning processes are carried out centrally, that the determination of the target corridors for a given motor vehicle can thus be performed as a function of the target corridors of other motor vehicles, which were, for example, put into operation earlier or entered the parking environment earlier so that, in the end, a coordinated traffic flow—in particular, also within the meaning of a clearance by sector—can be realized in the parking environment, in which traffic flow the individual motor vehicles move in a concerted fashion—in particular, also with respect to time—so that not only conflicting route sections can be avoided, but wait times, which can be caused, for example, by the maneuvering of another motor vehicle, can also be minimized.

In summary, the central computing unit thus acts as a central infrastructure control device for parking environments—in particular, parking garages—by means of which coordinated, temporally and/or spatially optimized routes up to the parking places or up to an exit can be determined taking into account the current traffic volume in the parking environment, which routes impose limits on the motor vehicles based on the specified corridors, the target corridors, within which limits the specific movement must occur. The sensor system of the parking environment is thus used to give bases for decision-making for the central route selection for the individual motor vehicles, wherein the determination of target corridors takes place in a coordinated fashion. Details, such as the specific trajectory within individual route sections/sectors—in particular, the velocity profile to be used and the exact route, continue to be planned in the motor vehicle by the respective vehicle systems, taking into consideration the specifications of the target corridor. Finally, the target corridor then thus specifies a (e.g., temporal and spatial) framework, within which the specific route and trajectory planning of the motor vehicle is to take place.

It is also noted that approaches that are basically already known and common for the communication of the central computing unit with the motor vehicles can also be pursued, wherein the communication with the motor vehicles preferably takes place via a pWLAN connection and/or a GSM connection. For example, the motor vehicle can be registered with the local WLAN network upon entry into the parking environment and possibly upon starting up again in the parking environment, ideally such that the current position of the newly registered motor vehicle becomes known to the central computing unit, for example, by detecting the motor vehicle in the region of an access road using sensors and/or by a motor vehicle put into operation again reporting its stored parking space to the central computing unit. Expediently, the map data set, or at least the portion of the map data set relevant to the target corridor, can be transmitted together with the target corridor to the motor vehicle, which can use it, for example, to perform its own position determinations and/or to correctly implement the target trajectory derived within the specifications of the target corridor. Besides a WLAN network, other wireless communication options—in particular, GSM connections—can naturally also be used within the framework of the present invention.

In doing so, it is of course expedient to at least update one target corridor dynamically—in particular in the case of a change in the underlying input data. After an update, the updated target corridor is, naturally, again transmitted to the respective motor vehicle. In this way, it is possible to react to changes in the parking environment or in the planning, if, for example, new interfering objects appear, motor vehicles deviate from their target corridors, which naturally also applies to temporal deviations, and the like. Finally, it is thus expedient to always keep the target corridors current based on the currently available input data, since an optimal coordination of the traffic in the parking environment is thus ensured.

The motor vehicles can in this case be operated manually by a driver in the parking environment, wherein the target corridor is then preferably used to generate corresponding outputs and/or driving instructions on the part of a navigation system so that the driver can be guided to his destination, whether that is a parking space or the exit. Within the framework of the method according to the invention, it is, however, particularly preferred if the motor vehicles in the parking environment are operated at least partially—in particular, fully-automatically along a trajectory determined within the framework of the specifications of the target corridor. Based on the central planning, the method according to the invention thus makes possible the facilitation of highly automated parking processes with self-driving motor vehicles in parking environments, wherein an extremely robust execution of the method according to the invention is also possible, since a lower number of deviations from the performed planning of the target corridors will take place. In particular, motor vehicles will generally enter the parking environment or will be put into operation in the parking environment one after the other so that with particularly well-predictable, fully automatic motor vehicle movements in the parking environment, a target corridor for newly appearing motor vehicles to be operated in the parking environment can be planned based on the already assigned spatial and temporal route sections (e.g., corridor sections) of the other motor vehicles. In doing so, it is, naturally, absolutely conceivable to also dynamically perform adjustments of the target corridors of motor vehicles already being operated in the parking environment, if an optimization of the traffic flow in the parking environment results in an overall view.

In this context, an advantageous further development of the method according to the invention provides that the parking environment comprise at least one transfer region, in which a motor vehicle can be parked for automatic shunting to a parking space and/or can be received after automatic return from a parking space to the transfer region. In order to have a motor vehicle fully automatically parked in the parking environment, the driver ultimately only has to move it into the transfer region and execute an operator control action there, which tells the central computing unit that the motor vehicle is now ready to be brought into a parking position by fully automated operation. An appropriate operator control action can ensure that a motor vehicle is driven fully automatically again from its parking space into the and/or another transfer region, where the driver can receive it and put it into operation again. In this respect, it is pointed out that the transfer region can, in particular, also be monitored by sensors of the parking environment, wherein it can be verified prior to the start of the fully automated operation by means of an analysis of these respective sensor data when a request for fully automatic shunting of the motor vehicle onto a parking space is received that no persons and/or objects are located in the transfer region and/or the vehicle. For this purpose, image processing algorithms, such as object recognition algorithms, can, for example, be applied to camera and/or laser scanner data.

Particularly advantageously, the actions can be selected via the automatic driving functions in the parking environment, selectable via a mobile device of a driver—in particular, a cell phone—preferably, a smartphone. On the mobile device can, for example, be provided an application (e.g., an app), which constitutes a user interface with control elements, via which the driver can select automatic driving functions, and can thus, for example, perform an operator control action, by which the mobile device generates a request for automatically parking the motor vehicle and transmits it to the central computing unit. Analogously, a request for pulling the motor vehicle out of the parking space and moving it to the transfer region can be generated and transmitted to the central control unit by an operator control action. In the process, the mobile device in a particularly preferred embodiment is connected to the motor vehicle, e.g., by means of a Bluetooth connection, so that an association of a requesting mobile device with a motor vehicle is possible without difficulty for the central computing unit, wherein other variants are naturally also conceivable, such as an identification of the motor vehicle stored in the mobile device, which is, in particular, expedient if the connection is currently not available, such as in the case of a request for moving the motor vehicle from a parking position into the transfer region. In this case, the motor vehicle can naturally also be identified via a stored parking space or the like. Conceivable are also variants, in which the respective request is forwarded via the motor vehicle to the central computing unit, at least in the case of a request to park the motor vehicle. Obviously possible are a plurality of designs with respect to communication and association, which can all be used within the framework of the present invention.

If a request for an automatic driving function was received on the part of the central computing unit, the request can be acknowledged accordingly—for example, using a mobile device (e.g., a mobile end device)—by means of an appropriate output; it is, however, preferable if a request received by the central computing unit occurs by means of a signal output using a light-signal system of the parking environment and/or a lighting device of the motor vehicle. For example, a green confirmation light in a light-signal system of the parking environment can light up and/or the direction indicators of the motor vehicle can acknowledge the received request by flashing briefly, as is already known from other remote control actions.

If the request was received and processed, and if a (e.g., first) target corridor was determined for the motor vehicle, wherein, as already mentioned, it can also be ensured in some embodiments that no persons and/or objects remained in the transfer region and/or in the motor vehicle, the fully automatic operation of the motor vehicle can start. If a gate at the entrance into the parking environment is provided, it can now be opened so that the motor vehicle can be moved fully automatically in the direction of a destination parking space. After moving the motor vehicle, such a gate is closed again. One embodiment provides that the start of the fully automated guidance of the motor vehicle is yet to be monitored by the driver—for example, for a specified monitored route, where it would still be possible for persons to get to the motor vehicle and the like. In this context, an analysis of the sensor data of the sensors monitoring the transfer region can also be carried out to the effect that it is checked whether the driver is still present as long as the motor vehicle is on the specified monitored route, wherein the automatic vehicle guidance can be aborted again if the driver is determined to be absent earlier. If a mobile device is used in an advantageous embodiment for selecting automatic driving functions, a confirmation can be sent to this mobile device that the driver can end his monitoring activities as soon as the motor vehicle has left the monitored route.

Sensors that can be used for monitoring in parking environments—in particular, parking garages—comprise, for example, cameras, LIDAR sensors (such as laser scanners), induction loops in the ground and the like. Such sensors can be connected to the central computing unit via a bus system. The sensors or their sensor data are now not only used within the framework of the present invention to update the map data set, but the motor vehicles operated in the parking environment are also tracked—in particular, also with respect to their position—so that the central computing unit knows all actively moving motor vehicles, as well as their positions.

In doing so, it can also be provided in an advantageous embodiment of the present invention that, in addition to the sensor data for monitoring, environmental data transmitted by at least a portion of the motor vehicles operated in the parking environment and/or ego data of the motor vehicles describing the operating state of the respective motor vehicle are also taken into consideration. It can thus be provided that vehicle data—specifically, environmental data and/or ego data—transmitted by the motor vehicles via the already existing communication link can also be used—in particular, to determine the traffic situation data. Environmental data, which are, in particular, derived from sensor data recorded in the motor vehicle and/or correspond to them, can be used in order to supplement the sensor data of the sensors of the parking environment and to obtain an improved picture of the parking environment. Ego data of the motor vehicles helps both in their monitoring and in the projection of future trajectories of motor vehicles for motor vehicles not operated fully automatically, wherein it can also be made plausible, in particular, whether the target corridor is followed and the like. Preferably, the ego data can include a current position of the respective motor vehicle, which position is determined in the motor vehicle itself—in particular, using the map data set transmitted to the motor vehicle, and is merged, in particular, with a position of the motor vehicle determined from the sensor data. In doing so, it can absolutely be provided that a position of the motor vehicle determined in the motor vehicle already results from a merging of different position hypotheses, such as from a tracking of the route driven since a last position and from a position determined by means of environmental data in the map data set. For this purpose, markers can, for example, be provided in the parking environment, which markers are detected by sensors of the motor vehicle and contain information regarding the position of the motor vehicle. Such a position determined in the motor vehicle itself can serve to make plausible a position of the motor vehicle derived from the sensor data of the sensors of the parking environment and/or improve the position determination overall and thus contribute to an improved basis for coordinated drive planning of the motor vehicles operated in the parking environment.

A further development of the method according to the invention provides that, if a spatial and temporal conflict of the target corridor with an object detected within the framework of monitoring and/or with a target corridor of another motor vehicle is detected, an adjustment of the target corridor takes place and/or conflict information indicating the conflict is transmitted to the motor vehicle occupied, in particular, by at least one person. It is thus a special aspect of the coordination and the dynamic adjustments of the target corridors to constantly monitor whether conflicts between the target corridors of the individual motor vehicles operated in the parking environment occur, in order to allow for a corresponding adjustment of the target corridors. Particularly expedient is such a functionality, however, also when the motor vehicle is not guided fully automatically, but operated by a driver, for example, in accordance with the instructions of a navigation system, since deviations from the actually planned target corridor can then occur, which deviations can result in conflicts with target corridors of other motor vehicles or even with objects in the parking environment, which can, however, also occur in other situations. If it is therefore recognized that a motor vehicle is on a collision course with an object, such as a wall or another motor vehicle, corresponding conflict information can be sent to the respective motor vehicle and output there and/or taken into consideration in the specific trajectory planning. This is particularly expedient if the conflicting object is still located outside the sensor range.

Advantageously, at least one light-signal system and/or gate of the parking environment can be controlled by the computing unit depending on the target corridors. The central computing unit is thus able to control all light-signal systems and/or gates in the parking environment—for example, by means of a building installation bus. Something like this can, for example, be expedient, as already explained, if a controlled transfer of the motor vehicle in the transfer region takes place such that a fully automatic guidance of the motor vehicle to a destination parking space is subsequently carried out; naturally, corresponding light signals are also expedient in the case of a request for a fully automated return drive of the motor vehicle to the same or another transfer region.

Expediently, the target corridors are determined within the framework of a route planning algorithm—in particular, an A* algorithm. Route planning algorithms are already known in the prior art. As soon as a destination parking space has been determined, which will be discussed in more detail below, a route to it can thus be found via a route planning algorithm, wherein oftentimes an optimization component already exists. Accordingly, a route planning from the parking space of the motor vehicle to the exit of the parking environment can naturally also take place.

As already mentioned, many route planning algorithms already use certain optimization criteria in order to determine an ideal route. According to the invention, this optimization is preferably extended by a consideration of all motor vehicles operated in the parking environment, which means that the optimization also takes place across motor vehicles with respect to both the spatial and the temporal route planning. If a motor vehicle, for example, has to take a slightly longer route to a destination parking space so that another motor vehicle can get to the exit much faster, corresponding modifications of the respective target corridors can be taken into consideration. This comprehensive optimization for the parking environment is another characteristic of the overall coordination, which is made possible by the central route planning on the part of the central computing unit.

Another advantageous embodiment of the invention provides that the target corridors are divided into route sections, wherein a time window for driving through the route section is selected for each route section, during which time window the route section does not conflict with a route section of another motor vehicle. Thus, a concretization of the temporal coordination on the part of the central computing unit is given, which ultimately corresponds to a clearance by sector of vehicle movements in the parking environment. Not only the spatial route to the parking space or to the exit is planned on the part of the central computing unit, but a temporal corridor in the overall flow of the traffic in the parking environment is also determined and reserved. For this purpose, it can, for example, be provided that a mutex method is used to select the time windows. Mutex, or mutual exclusion, represents a group of methods, by means of which undesired interactions between different controlled objects can be avoided.

This temporal coordination can naturally be realized as an aspect of the route planning per se and can also be included in the assessment in the planning of optimal target corridors. If, for example, a motor vehicle would have to wait too long at a location, another route can, for example, be selected or the destination can even be adjusted, which is yet to be discussed in more detail below.

Thus, a particularly preferred embodiment of the present invention provides that, for a motor vehicle to be parked on a parking space in the parking environment, a destination parking space is assigned as destination of the target corridor as a function of the traffic situation data and the target corridors of other motor vehicles. In other words, the destination parking space can also be selected as a function of the input data, and thus constitutes an adjustable parameter of the target corridor, which can, however, also be dynamically adjusted. It can, in particular, be provided in this respect that the selection of the destination parking space is selected with respect to a short route and/or short waiting times during the target corridor. If it is, for example, known from the traffic situation data and the target corridors of other motor vehicles that another motor vehicle currently parks on a certain floor of a parking garage, a currently considered motor vehicle can be assigned to another floor in order to avoid waiting times until the parking process of the other motor vehicle is concluded.

In addition to the method, the invention also relates to a central computing unit of a parking environment—in particular, of a parking garage—which central computing unit is designed to perform the method according to the invention. All embodiments relating to the method according to the invention can be analogously transferred to the computing unit according to the invention, so that the advantages already mentioned can be achieved with this computing unit. In particular, such a computing unit thus comprises suitable interfaces to the sensors assigned to the parking environment as well as a communication interface to the motor vehicles and possibly also to mobile devices.

Figure 1:
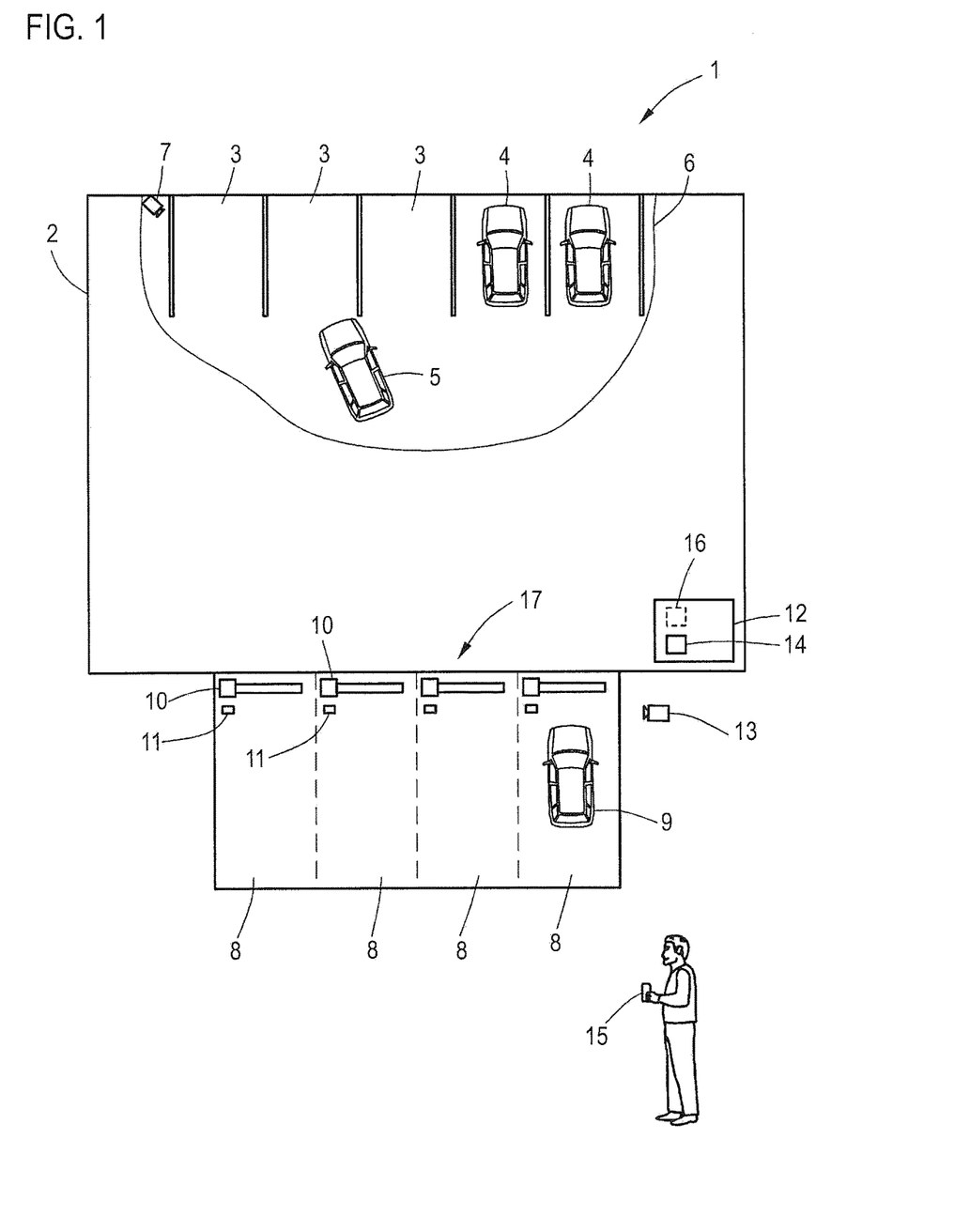
FIG. 1 shows a diagram of a structure of a parking environment.
Figure 2:
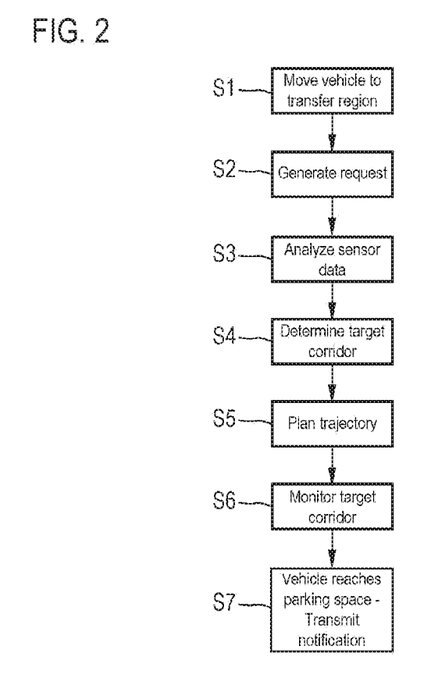
FIG. 2 shows a flow chart of an embodiment of a method for parking a motor vehicle.
Figure 3:
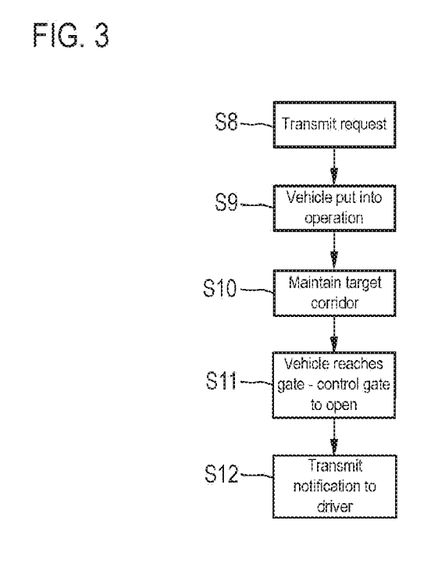
FIG. 3 a flow chart of a method for pulling a motor vehicle out of a parking space.

Additional advantages and details of the present invention are shown in the embodiments described hereinafter and from the drawing. The following is shown:

FIG. 1 a diagram of the structure of a parking environment,

FIG. 2 a flow chart of an exemplary embodiment of the method according to the invention for parking a motor vehicle, and FIG. 3 a flow chart of an exemplary embodiment of the method according to the invention for pulling a motor vehicle out of a parking space.

FIG. 1 shows a schematic diagram of a parking environment 1, in which the method according to the invention can be used. This parking environment is specifically a parking garage 2 with several floors/levels, wherein, in the parking environment, two existing parking spaces 3, motor vehicles 4 parked therein, and a motor vehicle 5 operated in the parking environment are only shown in a schematic section 6 for the sake of clarity. Shown also, representatively for different sensors for monitoring the parking environment 1, is a camera 7, with which the motor vehicle 5 can also be detected, among other things. Other conceivable sensors include induction loops, LIDAR sensors, laser scanners and the like.

In the region 17 of an entrance and exit into the parking garage 2 of the parking environment 1, several transfer regions 8 are shown, which can be used dynamically for temporarily parking motor vehicles 9 for the fully automatic parking in the parking environment 1 or for providing automatically pulled-out motor vehicles 4 and 5 after fully automated guidance to the exit. At the transfer regions, gates 10, as well as light-signal systems 11 are provided.

The operation in the parking environment 1 is completely controlled from a central computing unit 12, which receives the sensor data of the mentioned monitoring sensors via a sensor bus system, wherein at least one sensor 13 is also assigned to the transfer regions 8. In addition, the central computing unit 12 can control the gates 10 and the light-signal systems 11 at the transfer regions, as well as possibly additional existing light-signal systems and gates in the parking environment 1. For this purpose, a building installation bus can be used.

The central computing unit 12 furthermore comprises a WLAN communication interface 14, via which a communication link to the motor vehicles 4, 5, and 9 as well as to the mobile devices 15 can be established, which mobile devices are taken along by drivers of the motor vehicles 4, 5, and 9 and on which an application is available, which allows the selection of automatic driving functions, which will be discussed in more detail below.

In a storage unit 16 of the central computing unit 12, a map data set of the parking environment 1 is also stored.

The map data set can contain a map in various versions, such as a grid map, roadway network information and the like, and can be derived from building plans, surveyed manually, and/or generated and updated by vehicles with suitable sensor systems. The sensors 7 and 13 of the parking environment 1 are also used to always keep the map data set up to date.

The central computing unit 12 is designed to coordinate traffic in the driving environment according to a method according to the invention, which means that the central computing unit 12 initially analyzes the sensor data of the sensors 7 and 13 of the parking environment in order to determine the current positions of the motor vehicles 5 operating in the parking environment 1 and to track their movement. This, overall, results in traffic situation data, which can be used together with the map data set and already determined and/or simultaneously determined target corridors of other motor vehicles 5 operating in the parking environment 1 in order to determine a target corridor, which represents temporal and spatial specifications for the specific, in-vehicle trajectory planning, to the respective destination, and thus, in particular, to a destination parking space and/or a transfer region 8, for each motor vehicle 5 operating in the parking environment 1. After the motor vehicles 4, 5, and 9 are operating fully automatically in the parking environment 1 in the present exemplary embodiment, which means that they use a vehicle system designed for a fully automatic vehicle guidance, the target corridors can be transmitted to the motor vehicles 5 operating in the parking environment 1 and implemented there accordingly fully automatically by taking into consideration the temporal and spatial specifications contained therein as limits for the determination of specific trajectories to be traveled. However, as already shown above, exemplary embodiments of the present invention, in which the motor vehicles 5 operating in the parking environment 1 are at least partially controlled manually, are also conceivable.

For a more detailed explanation, flow charts for the parking of a motor vehicle 4, 5, and 9 and the pulling out of a motor vehicle 4, 5, and 9 are now to be considered with respect to FIGS. 2 and 3.

In step S1, if a driver wants to have his motor vehicle—for example, the motor vehicle 9—parked in the parking environment 1 in an automated fashion, he initially moves it into a transfer region 8. In this respect, it is pointed out that it is absolutely possible that the motor vehicle 9 was already registered with the parking environment 1 before—in particular, when the parking environment 1 has already been a destination of a navigation of the respective motor vehicle 9 for a longer period of time and the central computing unit 12 has an appropriate communication link—for example, access to the internet.

The motor vehicle 9 may already detected in the transfer region 8 by the sensors 13 and registers with the central computing unit 12, possibly already automatically via pWLAN. In alternative exemplary embodiments, a GSM connection can also be used. The carried-along mobile device 15 of the driver now has an application as already described in order to select automatic driving functions in the parking environment 1 and is connected to the motor vehicle 9 at least to such an extent that the associated motor vehicle 9 can be identified. The mobile device 15 also establishes a WLAN communication link to the central computing unit 12 at the latest when the application on the mobile device 15 is called.

In a step S2, the driver now generates via an operator control action on the mobile end device 15—in this case a smartphone—a request for automatically parking the motor vehicle 9, which request is transmitted to the central computing unit 12. If (suitable) parking spaces 3 are available, it is now initially checked on the part of the central computing unit 12 by analyzing the sensor data of the sensors 13 whether persons and/or objects are located in the transfer region 8, which would prevent a start of the fully automatic vehicle guidance. This takes place in a step S3.

In a step S4, a target corridor, including a destination parking space, is now determined for the motor vehicle 9 parked in the transfer region. A free, suitable parking space 3 is thus assigned to the motor vehicle 9 as destination parking space and the (at least rough) route to this parking space 3 is calculated in the central computing unit 12 using route planning algorithms, wherein a temporal corridor in the overall flow is also determined and reserved, for which mutex methods are used. For this purpose, the spatial route can be divided into route sections or sectors, which are respectively driven through during time windows, in which no other route section of a target corridor of another motor vehicle 5 operated in the parking environment 1 conflicts with the route section. Thus, a clearance by sector of the target corridor takes place so that a spatial and temporal planning or specification of the target corridor is carried out overall depending on the traffic situation data, the target corridors of other motor vehicles 5 operated in the parking environment 1, and the map data set. The determination of the target corridor is in the process subjected to an optimization that is focused on all motor vehicles 1 operated in the parking environment 1 in an overall view. In doing so, the destination parking space is incidentally also a changeable parameter of the target corridors. If, for example, a motor vehicle 5 currently parks on a certain floor, the motor vehicle 9 can be guided to another floor in order to avoid waiting times until the parking process of the other motor vehicle 5 is concluded.

In step S5, the fully automated vehicle guidance of the motor vehicle 9 to the destination parking space now starts taking into consideration the specifications by the target corridor, wherein the planning of the specific trajectory, e.g., of the route and the velocity profile in detail, takes place on the part of the motor vehicle in an appropriate vehicle system. For example, in order to adhere to the temporal flow, the respective velocities for the specific trajectory to be traveled can also be selected. The request for parking is confirmed via the light-signal system 11, the gate 10 is opened, and the motor vehicle 9 starts to move. At the same time, it is checked via the sensors 13 whether the driver still monitors the movement of the motor vehicle 9 until a monitored route up to behind the gate 10 has been traveled, whereupon a corresponding indication is transferred to the mobile device 15, and the driver can leave.

According to step S6, the target corridor is constantly monitored dynamically during the now following parking process, wherein, at least in the case of a change of the input data, and thus, in particular, of the traffic situation data and/or the target corridors of other motor vehicles 5 operated in the parking environment 1, the target corridor can be updated. If, for example, after the fully automatic vehicle guidance along the target corridor has already started, a request for pulling out a parked motor vehicle 4 from the same floor, in which the current destination parking space of the motor vehicle 9 is located, is received, the destination parking space can be changed dynamically in order to prevent long waiting times and conflicts—in particular, if a conflict between the target corridors results. At this point, it is also noted that, naturally, as is basically known, the specific trajectory planning in the motor vehicle 9 can also be subjected to adjustments based on current sensor data and operating data of the motor vehicle 9, wherein actions within the specifications of the target corridor are nonetheless performed in the process, and, in the case of a changed, current target corridor, a comprehensive recalculation in the motor vehicle 9 can also be initiated.

In a step S7, the motor vehicle 9 has then reached the destination parking space and is put out of operation. A notification regarding the successful conclusion of the parking process is transmitted to the mobile device 15 of the driver.

FIG. 3 shows the process when a driver wants to receive a parked motor vehicle 4 in a transfer region 8 again. In a step S8, the driver sends a request for pulling out his motor vehicle 4 to the central computing unit 12 via his mobile device 15. There, the request is received and the receipt is confirmed—for example, by transmitting the confirmation to the mobile device 15 and outputting it there accordingly. The central computing unit 12 now determines a transfer region 8 as destination position and a target corridor to this transfer region 8. The motor vehicle 4 is then put into operation fully automatically in a step S9. In a step S10, the target corridor is then constantly kept current with respect to possibly occurred changes analogously to step S6, wherein, in step S11, when reaching the gate 10, this gate is controlled by the central control unit 12 to open it, so that the motor vehicle 4 can be driven onto the transfer region 8, wherein the corresponding light-signal system 11, for example, can be operated to warn about the automatic operation of the motor vehicle. If the motor vehicle 4 is parked in the transfer region 8 in step S12, a corresponding notification is transmitted to the mobile device 15 of the driver, the light-signal system 11 switches, for example, to a green light, and the driver can get into his motor vehicle 4 and leave the parking environment 1.

It is also noted in this context that it is also conceivable to determine from the target corridor a time at which the motor vehicle 4 is then available in the transfer region 8, and to transmit it to the mobile device 15 so that the driver can adapt accordingly.

The invention claimed is:

1. A method for coordinating traffic of motor vehicles in a parking environment, comprising:
    evaluating, by a central computing unit, sensor data from sensors, wherein the central computing unit comprises a server, the central computing unit spatially and temporally coordinates traffic in the parking environment, the central computing unit and the sensors are assigned to the parking environment, the sensors monitor the parking environment, and the sensors deliver the sensor data to the central computing unit;
    determining, by the central computing unit, current traffic situation data of the parking environment based on the evaluating, wherein the current traffic situation data comprises positions of the motor vehicles operating in the parking environment;
    determining, by the central computing unit, a spatial and temporal target corridor for a destination of a motor vehicle in the motor vehicles based on input data, wherein the spatial and temporal target corridor provides spatial and temporal limits within which specific path and trajectory planning of the motor vehicle is to occur, and the input data comprises the current traffic situation data, a map data set stored in the central computing unit, and spatial and temporal target corridors determined for other motor vehicles in the motor vehicles;
    transmitting, by the central computing unit, the spatial and temporal target corridor to the motor vehicle;
    transmitting, by the central computing unit, a recommendation to wait to another motor vehicle in the motor vehicles, or a mobile device associated with the other motor vehicle, during a planned departure of the other motor vehicle from the parking environment, wherein the mobile device transmitted a request for an automatic departure of the other motor vehicle to the central computing unit; and
    outputting, by the central computing unit, a confirmation of the request to the mobile device when, as a result of a high volume of traffic, a time to reach an exit according to an optimal target corridor exceeds a threshold value.

2. The method according to claim 1, wherein the motor vehicles in the parking environment are operated partially or fully automatically along a trajectory determined within the spatial and temporal limits of the spatial and temporal target corridor.

3. The method according to claim 1, wherein the parking environment has a transfer region in which the motor vehicle is parked for automatic shunting to a parking space or is received after automatic return from the parking space to the transfer region.

4. The method according to claim 1, wherein automatic driving functions in the parking environment are selected via a mobile device of a driver, wherein the mobile device of the driver comprises a cell phone.

5. The method according to claim 4, wherein the ego data comprises a current position of the motor vehicle, wherein the current position was determined in the motor vehicle using the map data set transmitted to the motor vehicle, and the current position is merged with a position of the motor vehicle determined from the sensor data.

6. The method according to claim 1, wherein the input data further comprises environmental data transmitted by the motor vehicles operating in the parking environment or ego data of the motor vehicles operating in the parking environment, wherein the ego data describes operating states of the motor vehicles operating in the parking environment.

7. The method according to claim 1, further comprising adjusting the spatial and temporal target corridor in response to detecting at least one of a spatial and temporal conflict of the spatial and temporal target corridor with an object detected based on the determining the current traffic situation, or a spatial and temporal conflict of the spatial and temporal corridor with a target corridor of the other motor vehicle.

8. The method according to claim 1, wherein a light-signal system or gate of the parking environment is controlled by the central computing unit based on the spatial and temporal target corridors.

9. The method according to claim 1, wherein the spatial and temporal target corridors are determined within a framework of a route planning algorithm or within a framework of an optimization for the motor vehicles operating in the parking environment, wherein the route planning algorithm comprises an A* algorithm.

10. The method according to claim 9, wherein a mutex method is used to select time windows for each route section in the route sections.

11. The method according to claim 10, wherein the destination parking space is selected based on a shortest route or a shortest waiting time during the spatial and temporal target corridor.

12. The method according to claim 1, wherein spatial and temporal target corridors of the motor vehicles are divided into route sections, wherein a time window for driving through a route section is selected for each route section in the route sections, and during a time window a first route section for a first motor vehicle does not conflict with a second route section for a second motor vehicle.

13. The method according to claim 1, wherein for the motor vehicle to be parked in a parking space in the parking environment, a destination parking space is assigned as a destination of the spatial and temporal target corridor based on the current traffic situation data and the spatial and temporal target corridors determined for other motor vehicles.

14. A central computing unit of a parking environment comprising:
a memory; and
at least one processor coupled to the memory and configured to:
  evaluate sensor data from sensors, wherein the sensors monitor the parking environment, the sensors deliver the sensor data to the central computing unit, and the sensors are assigned to the parking environment;
  determine current traffic situation data of the parking environment based on the evaluating, wherein the current traffic situation data comprises positions of motor vehicles operating in the parking environment;
  determine a spatial and temporal target corridor for a destination of a motor vehicle in the motor vehicles based on input data, wherein the spatial and temporal target corridor provides spatial and temporal limits within which specific path and trajectory planning of the motor vehicle is to occur, and the input data comprises the current traffic situation data, a map data set stored in the memory of the central computing unit, and spatial and temporal target corridors determined for other motor vehicles in the motor vehicles;
  transmit the spatial and temporal target corridor to the motor vehicle;
  transmit a recommendation to wait to another motor vehicle in the motor vehicles, or a mobile device associated with the other motor vehicle, during a planned departure of the other motor vehicle from the parking environment, wherein the mobile device transmitted a request for an automatic departure of the other motor vehicle to the central computing unit; and
  output a confirmation of the request to the mobile device when, as a result of a high volume of traffic, a time to reach an exit according to an optimal target corridor exceeds a threshold value,
wherein the central computing unit comprises a server, the central computing unit spatially and temporally coordinates traffic in the parking environment, and the central computing unit is assigned to the parking environment.

* * * * *